US009055085B2

(12) United States Patent
Mao

(10) Patent No.: US 9,055,085 B2
(45) Date of Patent: Jun. 9, 2015

(54) DYNAMIC GENERATION OF MEDIA CONTENT ASSETS FOR A CONTENT DELIVERY NETWORK

(75) Inventor: Weidong Mao, West Windsor, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 231 days.

(21) Appl. No.: 12/751,257

(22) Filed: Mar. 31, 2010

(65) Prior Publication Data

US 2010/0250773 A1 Sep. 30, 2010

Related U.S. Application Data

(60) Provisional application No. 61/165,197, filed on Mar. 31, 2009.

(51) Int. Cl.
*G06F 15/16* (2006.01)
*H04L 29/08* (2006.01)
*H04N 21/222* (2011.01)
*H04N 21/231* (2011.01)
*H04N 21/2312* (2011.01)
*H04N 21/4788* (2011.01)
*H04N 21/63* (2011.01)
*H04L 29/06* (2006.01)

(52) U.S. Cl.
CPC .......... *H04L 67/1095* (2013.01); *H04N 21/222* (2013.01); *H04N 21/23103* (2013.01); *H04N 21/2312* (2013.01); *H04N 21/4788* (2013.01); *H04N 21/632* (2013.01); *H04L 65/4084* (2013.01); *H04L 67/2847* (2013.01); *H04L 67/2842* (2013.01); *H04L 67/2852* (2013.01)

(58) Field of Classification Search
CPC ............... H04N 21/2387; H04N 5/783; H04L 65/4084; G11B 27/005; G06F 17/3002
USPC .......................................................... 709/231
See application file for complete search history.

(56) References Cited

U.S. PATENT DOCUMENTS

| 5,542,072 A | 7/1996 | Kawashima et al. |
| 6,272,598 B1 | 8/2001 | Arlitt et al. |
| 6,378,130 B1 | 4/2002 | Adams |
| 6,438,596 B1 | 8/2002 | Ueno et al. |
| 6,449,730 B2 | 9/2002 | Mann et al. |
| 6,774,926 B1 | 8/2004 | Ellis et al. |
| 7,065,778 B1 | 6/2006 | Lu |
| 7,080,138 B1 | 7/2006 | Baker et al. |
| 7,080,400 B1 | 7/2006 | Navar |
| 7,143,170 B2 | 11/2006 | Swildens et al. |
| 7,350,041 B1 | 3/2008 | Armangau et al. |
| 7,404,201 B2 | 7/2008 | Takeuchi et al. |
| 7,454,424 B2 | 11/2008 | Cherkasova |

(Continued)

OTHER PUBLICATIONS

U.S. Appl. No. 12/751,148, filed Mar. 31, 2010, Dynamic Distribution of Media Content Assets for a Content Delivery Network.

(Continued)

*Primary Examiner* — Waseem Ashraf
(74) *Attorney, Agent, or Firm* — Banner & Witcoff, Ltd.

(57) ABSTRACT

Systems, apparatuses, methods, and software for using a network to efficiently distributing media content assets from a virtually unlimited content library and/or other storage to a plurality of client devices, as well as bi-directional local content sharing between head ends, and dynamic distribution and generation of media content assets within the network.

11 Claims, 10 Drawing Sheets

Generate and Stream Trick File

(56) References Cited

U.S. PATENT DOCUMENTS

| | | | |
|---|---|---|---|
| 7,761,900 B2 | 7/2010 | Crayford | |
| 7,764,863 B1* | 7/2010 | Strasman et al. | 386/343 |
| 7,802,286 B2 | 9/2010 | Brooks et al. | |
| 7,822,862 B2 | 10/2010 | Slater et al. | |
| 7,860,948 B2 | 12/2010 | Hundscheidt et al. | |
| 7,886,069 B2* | 2/2011 | Osborne | 709/231 |
| 7,941,823 B2* | 5/2011 | Hasek | 725/88 |
| 7,962,942 B1* | 6/2011 | Craner | 725/88 |
| 7,991,883 B1 | 8/2011 | Streeter et al. | |
| 8,099,508 B2 | 1/2012 | Mao et al. | |
| 8,145,570 B2* | 3/2012 | Major et al. | 705/51 |
| 8,166,510 B1 | 4/2012 | Ducharme | |
| 8,539,535 B2* | 9/2013 | Hasek | 725/93 |
| 8,914,534 B2* | 12/2014 | Braness et al. | 709/231 |
| 2002/0007491 A1 | 1/2002 | Schiller et al. | |
| 2002/0016970 A1* | 2/2002 | Negishi et al. | 725/88 |
| 2002/0091760 A1 | 7/2002 | Rozen | |
| 2002/0152364 A1* | 10/2002 | Gunaseelan et al. | 711/170 |
| 2002/0154892 A1 | 10/2002 | Hoshen et al. | |
| 2003/0118243 A1* | 6/2003 | Sezer et al. | 382/245 |
| 2003/0149988 A1 | 8/2003 | Ellis et al. | |
| 2003/0217113 A1 | 11/2003 | Katz et al. | |
| 2004/0093618 A1* | 5/2004 | Baldwin et al. | 725/101 |
| 2004/0103120 A1 | 5/2004 | Fickle et al. | |
| 2004/0103437 A1 | 5/2004 | Allegrezza et al. | |
| 2004/0107436 A1 | 6/2004 | Ishizaki | |
| 2004/0117850 A1 | 6/2004 | Karaoguz et al. | |
| 2004/0187160 A1 | 9/2004 | Cook et al. | |
| 2004/0244058 A1* | 12/2004 | Carlucci et al. | 725/135 |
| 2004/0246376 A1 | 12/2004 | Sekiguchi et al. | |
| 2004/0261094 A1 | 12/2004 | Huslak et al. | |
| 2005/0028208 A1 | 2/2005 | Ellis et al. | |
| 2005/0188055 A1 | 8/2005 | Saletore | |
| 2005/0262542 A1 | 11/2005 | DeWeese et al. | |
| 2005/0267948 A1* | 12/2005 | McKinley et al. | 709/217 |
| 2005/0275758 A1* | 12/2005 | McEvilly et al. | 348/725 |
| 2006/0005224 A1 | 1/2006 | Dunning et al. | |
| 2006/0020995 A1* | 1/2006 | Opie et al. | 725/117 |
| 2006/0085553 A1 | 4/2006 | Rachwalski et al. | |
| 2006/0085816 A1* | 4/2006 | Funk et al. | 725/34 |
| 2006/0146040 A1* | 7/2006 | Shen | 345/204 |
| 2006/0218607 A1* | 9/2006 | Hodzic et al. | 725/100 |
| 2006/0277581 A1 | 12/2006 | Eliyahu et al. | |
| 2006/0280431 A1* | 12/2006 | Blattman et al. | 386/68 |
| 2007/0140647 A1* | 6/2007 | Kusunoki et al. | 386/68 |
| 2007/0143457 A1* | 6/2007 | Mao et al. | 709/223 |
| 2007/0157281 A1 | 7/2007 | Ellis et al. | |
| 2007/0276926 A1* | 11/2007 | LaJoie et al. | 709/219 |
| 2008/0049186 A1 | 2/2008 | MacDougall et al. | |
| 2008/0071859 A1 | 3/2008 | Seed et al. | |
| 2008/0089299 A1 | 4/2008 | Lindsley et al. | |
| 2008/0124052 A1* | 5/2008 | Sardera | 386/124 |
| 2008/0148327 A1* | 6/2008 | Xu | 725/105 |
| 2008/0148627 A1 | 6/2008 | Suraci et al. | |
| 2008/0155614 A1* | 6/2008 | Cooper et al. | 725/91 |
| 2008/0168133 A1* | 7/2008 | Osborne | 709/203 |
| 2008/0187283 A1* | 8/2008 | Takahashi | 386/68 |
| 2008/0209491 A1* | 8/2008 | Hasek | 725/114 |
| 2008/0253406 A1 | 10/2008 | Hasek | |
| 2008/0263057 A1* | 10/2008 | Thompson | 707/10 |
| 2008/0270610 A1 | 10/2008 | John et al. | |
| 2008/0298773 A1* | 12/2008 | Honjo | 386/95 |
| 2008/0307475 A1 | 12/2008 | Liwerant et al. | |
| 2008/0307479 A1 | 12/2008 | Jones et al. | |
| 2009/0031390 A1* | 1/2009 | Rajakarunanayake et al. | 725/142 |
| 2009/0049186 A1* | 2/2009 | Agnihotri et al. | 709/231 |
| 2009/0083806 A1 | 3/2009 | Barrett et al. | |
| 2009/0083813 A1* | 3/2009 | Dolce et al. | 725/93 |
| 2009/0113068 A1 | 4/2009 | Fujihira et al. | |
| 2009/0119322 A1* | 5/2009 | Mills et al. | 707/101 |
| 2009/0136204 A1* | 5/2009 | Chen et al. | 386/68 |
| 2009/0158326 A1* | 6/2009 | Hunt et al. | 725/38 |
| 2009/0158626 A1 | 6/2009 | Aynsley | |
| 2009/0161765 A1* | 6/2009 | Joyce et al. | 375/240.23 |
| 2009/0249419 A1 | 10/2009 | Kahn et al. | |
| 2009/0271818 A1 | 10/2009 | Schlack | |
| 2009/0292526 A1* | 11/2009 | Harari et al. | 704/9 |
| 2009/0307329 A1 | 12/2009 | Olston et al. | |
| 2009/0310933 A1* | 12/2009 | Lee | 386/68 |
| 2010/0003008 A1* | 1/2010 | Thomas et al. | 386/69 |
| 2010/0058405 A1 | 3/2010 | Ramakrishnan et al. | |
| 2010/0082349 A1 | 4/2010 | Bellegarda et al. | |
| 2010/0094969 A1 | 4/2010 | Zuckerman et al. | |
| 2010/0115575 A1* | 5/2010 | Yu et al. | 725/142 |
| 2010/0122282 A1* | 5/2010 | DuBose | 725/32 |
| 2010/0146139 A1* | 6/2010 | Brockmann | 709/231 |
| 2010/0149301 A1* | 6/2010 | Lee et al. | 348/14.08 |
| 2010/0202509 A1* | 8/2010 | Thompson et al. | 375/240.01 |
| 2010/0218208 A1 | 8/2010 | Holden | |
| 2010/0235744 A1* | 9/2010 | Schultz et al. | 715/717 |
| 2010/0246670 A1* | 9/2010 | Takemoto et al. | 375/240.02 |
| 2010/0251304 A1* | 9/2010 | Donoghue et al. | 725/46 |
| 2010/0251305 A1* | 9/2010 | Kimble et al. | 725/46 |
| 2010/0251313 A1* | 9/2010 | Mao | 725/98 |
| 2010/0312861 A1 | 12/2010 | Kolhi et al. | |
| 2011/0099332 A1 | 4/2011 | Sofman et al. | |

OTHER PUBLICATIONS

U.S. Appl. No. 12/751,231, filed Mar. 31, 2010, Bi-Directional Transfer of Media Content Assets in a Content Delivery Network.

* cited by examiner

DYNAMIC GENERATION OF MEDIA CONTENT ASSETS FOR A CONTENT DELIVERY NETWORK

CROSS-REFERENCE TO RELATED APPLICATIONS

The present application claims priority to U.S. provisional patent application Ser. No. 61/165,197, filed Mar. 31, 2009, entitled "Building Large VOD Libraries With Next Generation On Demand Architecture," hereby incorporated by reference as to its entirety.

BACKGROUND

Increasingly, cable operators are using video-on-demand (VOD) as a competitive advantage. Alternative video delivery methods such as movie download or video streaming via the Internet are also becoming more practical and feasible as service providers deploy either DOCSIS 3.0 wideband or fiber-to-the-home technologies.

Using the existing managed network approach that is adopted by various cable and telephone network operators, VOD content is typically encoded in MPEG-2 format and replicated/pushed along with metadata via a satellite or Internet Protocol (IP) backbone to local VOD systems. However, this approach does not necessarily scale well as the amount of available content increases. For instance, as the network grows and the amount of VOD content expands, it quickly becomes overly burdensome on the network to replicate all of the content out to local VOD systems.

In an alternative emerging "over-the-top" approach, the broadband Internet is typically used as the content distribution and streaming platform. In this approach, content aggregators and integrators license and publish movies and television shows via Internet websites. Client devices such as set-top boxes may be able to access media content via the Internet using a broadband pipe such as via a cable modem, DSL connection, or fiber-to-the-home (FTTH) network. Content distribution within the Internet is often driven by a "pull" model in response to client device requests.

However, there are several limitations of this over-the-top approach. For instance, it may be difficult to achieve high concurrency for high-definition (HD) VOD streaming, and this approach relies on public Internet infrastructure that imposes quality of service constraints, which may result in substantial network congestion. Moreover, there is typically a lack of end-to-end network resource management, as well as inconsistent premium content offerings due to lack of programming agreements with content providers. In addition, a pure over-the-top approach typically requires subscribers to purchase a separate client device appliance for viewing VOD assets.

There are significant opportunities for network operators to expand the current VOD architecture in order to support larger VOD content libraries that provide an expansive amount of content, and to provide the VOD offerings to devices other than conventional set-top boxes, such as personal computers and portable media players. Such a new architecture may be capable of handling larger non-VOD content libraries as well.

SUMMARY

An integrated video-on-demand (VOD) content library platform may be provided that supports virtually an unlimited amount of media content assets such as movies, television shows, Internet video, and user-generated content. This approach may combine features of existing managed network approaches with emerging over-the-top approaches, by introducing a content delivery network that has a large content library, typically made up of smaller libraries interconnected together and with content providers and local head ends via a high-speed backbone, such as an Internet Protocol (IP) backbone, and/or via regional networks.

The content delivery network may enable operators to cost-effectively provide a much larger amount of media content, such as VOD content, by serving at least some of the content from national and regional libraries instead of replicating all content to the local distribution systems (e.g., head end systems) as is conventionally done. Intelligent caching may be used by the content delivery network and/or by the local systems, where the caching locations and caching timeframes for each piece of content may be based on such priority factors as the actual or expected popularity (global or local) of the content, the actual or expected usage (global or local) of the content, the quality of service (QoS) of the content, the data size of the content, storage and responsiveness expectations defined by service-level agreements (SLAs), the demographics of the expected audience for the content, and the identity of the provider or owner of the content. Such intelligent caching may be expected to reduce network bandwidth usage and enhance overall service performance by potentially reducing the amount of redundant storage and transfer that would ordinarily be needed as the amount of available content increases.

As a default, most content may be stored in the main content library. Then, depending upon content popularity and/or other factors, the content may be replicated and propagated ahead of time, or in response to a client request, to or near one or more of the local head end systems. Upon a subscriber's request for content, the local system serving that subscriber may begin immediately streaming the content if the content is already cached at the local system. If the content is not cached at the local system, then the local system may pull the content from the content library or elsewhere. The pulled content may thereafter continue to be cached at the local system for a period of time to serve expected future requests from other subscribers served by that local system, and then later removed if desired.

In addition, certain content, such as trick files, may be generated dynamically as needed. In this way, it is not necessarily to pre-generate and pre-store all possible trick files for real-time and non-real-time content.

And, because not all content will necessarily be stored at all local regions of the network, a bi-directional transfer of content between local regions of the network may be provided for. For example, a first head end system may not only receive content downstream from the main network, but may also send content upstream through the network to another head end system requesting the content.

Thus, some aspects as described herein may be directed to systems, apparatuses, methods, and software for receiving from a first client device a first request for a media content asset; responsive to the first request, determining whether the media content asset is stored at a first location in a network; responsive to determining that the media content asset is not stored at the first location, fetching the media content asset from a second location in the network and storing the media content asset in a computer-readable medium at the first location; streaming to the first client device the media content asset stored at the first location; and responsive to a second request from a second client device, streaming to the second client device the media content asset stored at the first location.

Further aspects are directed to systems, apparatuses, methods, and software utilizing a network storing a plurality of media content assets, for determining a popularity of each of the media content assets; and for each of the media content assets, replicating the stored media content asset to a particular computer-readable medium in the network that depends upon the determined popularity for that media content asset.

Still further aspects are directed to systems, apparatuses, methods, and software for receiving a request for a first media content asset; determining whether the first media content asset is already stored; and responsive to determining that the first media content asset is not already stored, generating by a computer the first media content asset from a stored second media content asset.

Yet further aspects are directed to systems, apparatuses, methods, and software for receiving first media content and associated first metadata at a first video-on-demand system, the first video-on-demand system being configured to stream media content assets to a first plurality of client devices; storing, by the first video-on-demand system, a first media content asset in a first computer-readable medium; and sending, by the first video-on-demand system, the first metadata to a database, wherein the database is accessible by a second video-on-demand system configured to stream media content assets to a second plurality of client devices to which the first video-on-demand system is not configured to stream media content assets.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
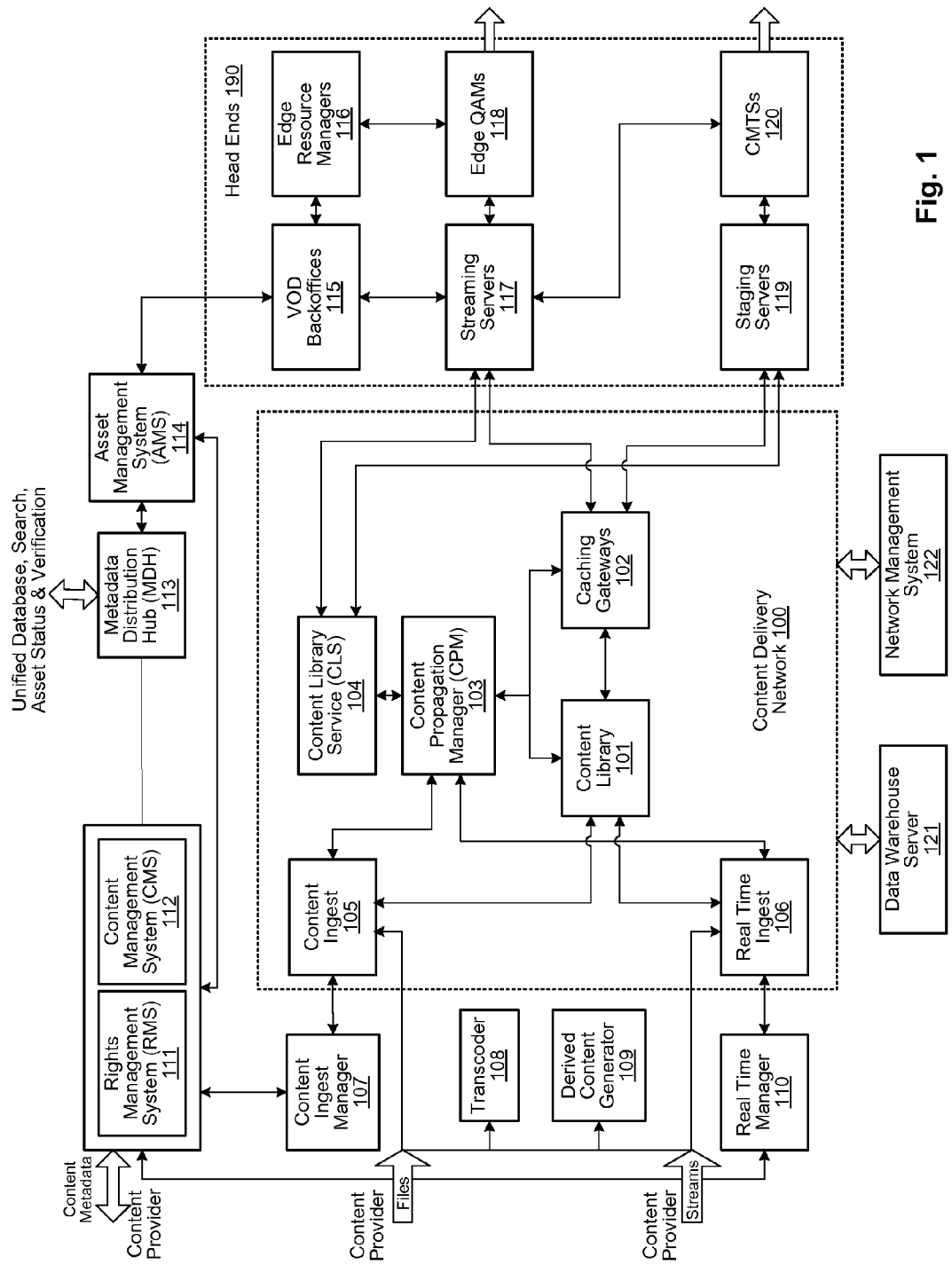
FIG. 1 is a functional block diagram of an illustrative content delivery network 100 and surrounding environment.

FIG. 1 is a functional block diagram of an illustrative content delivery network 100 and surrounding environment. In this example, content delivery network 100 includes a content library 101, a caching gateway 102, a content propagation manager (CPM) 103, a content library service (CLS) 104, a content ingest block 105, and a real-time ingest block 106, each being communicatively coupled to each other (bidirectionally or unidirectionally as desired) in the manner shown in FIG. 1.

Content delivery network 100 in this example may be communicatively coupled to (again, bidirectionally or unidirectionally as desired) the following functional blocks: a content ingest manager 107, a transcoder 108, a derived content generator 109, a real-time manager 110, a rights management system (RMS) 111, a content management system (CMS) 112, a metadata distribution hub (MDH) 113, an asset management system (AMS) 114, one or more video-on-demand (VOD) backoffices 115, one or more edge resource managers 116, one or more streaming servers 117, one or more edge quadrature amplitude modulation (QAM) units 118, one or more staging servers 119, one or more cable modem termination systems (CMTSs) 120, a data warehouse server 121, and a network management system 122 Together, VOD backoffices 115, edge resource managers 116, streaming servers 117, edge QAMs 118, staging servers 119, and CMTSs 120 may be considered as one or more head ends 190 for content delivery network 100.

Content delivery network 100 may be any type of network, and may be a single network or a combination of multiple networks, such as a television distribution network, a telephone network, and/or the Internet. Physically, content delivery network 100 may be embodied as multiple computers communicatively coupled together in a wired and/or wireless manner. Content delivery network 100 may also be communicatively coupled to a plurality of end-user client devices 201A-H (FIG. 2) in a wired and/or wireless manner, such as via coaxial cable, optical fiber, hybrid-fiber-coaxial cable, and/or cellular data or telephone links. While content delivery network 100 is shown to encompass certain functional blocks and not other functional blocks, it is noted that this division may be functional rather than necessarily physical, and somewhat arbitrary. Thus, content delivery network 100 may alternatively include others of the functions shown in FIG. 1. For instance, head ends 190 may be considered part of content delivery network 100. Alternatively or additionally, some of the functional blocks shown in FIG. 1 as part of content delivery network 100 may be considered outside of content delivery network 100.

Any of the above-mentioned functional blocks 101-122 may each be implemented, for example, as a computer or as a system or device that includes a computer. The term "computer" as referred to herein broadly refers to any electronic, electro-optical, and/or mechanical device, or system of multiple physically separate or physically joined such devices, that is able to process and manipulate information, such as in the form of data. Non-limiting examples of a computer include one or more personal computers (e.g., desktop or laptop), servers, smart phones, personal digital assistants (PDAs), television set top boxes, and/or a system of these in any combination or subcombination. In addition, a given computer may be physically located completely in one location or may be distributed amongst a plurality of locations (i.e., may implement distributive computing). A computer may be or include a general-purpose computer and/or a dedicated computer configured to perform only certain limited functions.

A computer typically includes hardware that may execute software and/or be configured in hardware to perform specific functions. The software may be stored on a computer-readable medium in the form of computer-readable instructions. A computer may read those computer-readable instructions, and in response perform various steps as defined by those computer-readable instructions. Thus, any functions attributed to any of functional blocks 101-122 as described herein may be implemented, for example, by reading and executing such computer-readable instructions for performing those functions, and/or by any hardware subsystem (e.g., a processor) from which the computer is composed.

The term "computer-readable medium" as used herein includes not only a single physical medium or single type of medium, but also a combination of one or more physical media and/or types of media. Examples of a computer-readable medium include, but are not limited to, one or more memories, hard drives, optical discs (such as CDs or DVDs), magnetic discs, and magnetic tape drives.

Such a computer-readable medium may store computer-readable instructions (e.g., software) and/or computer-readable data (i.e., information that may or may not be executable). In the present example, a computer-readable medium (such as memory) may be included in any one or more of functional blocks 101-122 and may store computer-executable instructions and/or data used by any of those blocks 101-122. Alternatively or additionally, such a computer-readable medium storing the data and/or software may be physically separate from, yet accessible by, any of blocks 101-122.

In general, content delivery network 100 is configured to receive a plurality of media content assets, store the media content assets in various distributed locations such as content library 101, one or more caching gateways 102, and/or one or more head ends 190 such as one or more streaming servers 117. Content delivery network 100 is further configured to forward selected ones of the media content assets to end users via edge QAMs 118. In other embodiments, media content assets may be streamed to client devices 201 by other additional or alternative means, such as over the Internet or over a cellular data network. In such a case, QAMs 118 may be replaced or augmented with other devices appropriate for providing the requested media content assets to client devices 201. Each media content asset may be stored at a single location within content delivery network 100 and/or head ends 190, or replicated among multiple different locations within content delivery network 100 and/or head ends 190.

A "media content asset" is any unit of media content that includes audio and/or video content. As used herein, the term, "video content asset," is a media content asset that includes video content and may optionally also include audio content. Likewise, an "audio content asset" is a media content asset that includes audio content and may optionally also include video content. Examples of a media content asset includes, without limitation, movies, television programs, news programs, advertisements, video clips, audio (e.g., radio) programs, audio clips, and trick files. Media content assets may include live content (e.g., a live sports game) and/or pre-recorded content, and may include VOD content or pre-scheduled broadcast content. A media content asset may also be associated with or include metadata that is descriptive of the media content asset and/or the content therein. For example, such metadata may include or otherwise indicate a description of the content in the media content assets, a date or date range of the content, a time length of the content, a data size of the content, a format of the content, a bit rate of the content, etc.

Referring again to FIG. 1, one or more content providers provide media content assets in the form of files (typically for non-real-time content) and/or streams (typically for real-time content), along with any associated content metadata to transcoder 108, which may transcode the incoming content to a target format, such as by transcoding the content to different CODEC standards and resolutions. Derived content generator 109 generates trick files and other types of derived content from the original content, such as fast-forward and rewind trick files, movie trailers, re-formatted content, and advertising-spliced content. Content ingest manager 107 and content ingest block 105 handle the receipt and ingest of the non-real-time content into content delivery network 100, including managing ingest provisioning and life cycle and negotiating with CPM 103 for storage locations within content library 101.

Real-time manager 110 and real-time ingest block 106 have a similar function as content ingest manager 107 and content ingest block 105, except that these functions are performed for incoming streamed real-time content. In addition, real-time manager 110 assigns multicast addresses and ports for real-time content distribution. The encoded video program of a real-time media content asset may be sent via, e.g., IP multicast, and real-time manager 110 may direct real-time ingest block 106 to join the corresponding multicast and record the encoded stream based on the start and end times. The resulting files may be stored in content library 101, caching gateways 102, and/or streaming servers 117 as desired. Client devices 201 may request session and streaming of a real-time media content asset during and/or after the real-time ingest of that particular asset into content delivery network 100, and may further perform certain trick modes on real-time content assets as appropriate, such as rewind and pause.

MDH 113 interfaces with content delivery network 100, and the metadata and status for stored media content assets may be reported to MDH 113 so as to make the assets available for applications such as for queries by, and storage to, a unified database 901 (FIG. 9), and for asset status and verification.

AMS 114 manages VOD asset metadata, and CMS 112 publishes the asset metadata to AMS 114, such as via a CableLabs ADI interface. The asset metadata of the ADI package is sent to AMS 114 while the content files are ingested into content delivery network 100. Together, CMS 112 and RMS 111 may support both VOD content metadata (such as using CableLabs ADI) and Internet video metadata (such as using Media Really Simple Syndication, or RSS) formats.

Interface with Asset Management System: The content metadata is published to the Regional Asset Management Systems via the CableLabs ADI interface. Only the metadata is sent via this interface while the content files are ingested into the CDN.

RMS 111 manages the licensing rights of real-time media content assets, including enabling and disabling based on licensing rights whether each real-time media content asset may be real-time ingested, determining licensing start and end times of real-time media content assets, and controlling certain business rules such as disabling fast forward trick play for real-time media content assets.

Data warehouse server 121 archives content usage statistics periodically received from content delivery network 100 and/or VOD backoffices 115.

Network management system 122 provides a network management interface for configuration, monitoring, fault detection, and alarm functions.

Content library 101 includes one or more physical computer-readable media for storing the media content assets ingested by content ingest 105 and real-time ingest 106, along with one or more computers for managing the input, output, and internal data management of content library 101. While content library 101 is shown as a single functional block in FIG. 1, in reality the various computer-readable media may include multiple computer-readable media and computers distributed over a wide geographical area, especially where content delivery network 100 itself services client devices 201 that are geographically diverse. The computer-readable media and computers may be interconnected via, e.g., an IP network. Thus, content library 101 may actually be a collection of multiple libraries that together are functionally treated as one logical library. In some embodiments, content library 101 may have a multi-tiered hierarchical topology of the various computer-readable media.

Caching gateways 102 include one or more physical computer-readable media for storing at least a subset of the media content assets stored in content library 101, along with one or more computers for managing the input, output, and internal data management of caching gateways 102. In general, media content assets may be replicated into one or more of caching gateways 102 as desired. Thus, while not necessarily always the case, it may be expected that any media content assets stored in caching gateways 102 may also be stored somewhere in content library 101. As is the case with content library 101, the various computer-readable media of caching gateways 102 may also be distributed over a wide geographical area. While caching gateways 102 and content library 101 are shown as separate functional blocks, physically they may share some or all of the same computer-readable media and/or computers. Alternatively, caching gateways 102 and content library 101 may be embodied as physically separate systems.

CPM 103 may contain multiple content library 101 nodes coupled via national and/or regional networks, such as IP networks. CPM 103 is responsible for replicating and/or moving the media content assets through various storage locations of content library 110 and/or caching gateways 102 in a dynamic manner based on content popularity, content usage, and/or other factors. CPM 103 is further responsible for deciding and directing which particular ones of the streaming servers 117 will stream particular content to client devices 201. This decision may be based on, for example, the current or expected load of the various streaming servers 117.

The locations for all media content assets within content delivery network 100 are maintained and updated by the CLS 104. Upon a session setup request from a client device 201, if the requested content is already pre-positioned or cached at a streaming server 117, the content will be streamed from streaming server 117 to the requesting client device 201. If the content is not available at the streaming server 117, head end 190 will query CLS 104 for the locations of the requested media content asset within content library 101 and/or caching gateways 102 in order to fetch the media content asset and stream it to the requesting client device 201.

Upon initial ingest of a media content asset, content ingest block 105 and real-time ingest block 106 report the status and location of the media content asset to CLS 104. Then, when the location is requested by head end 190, CPM 103 fetches the reported location from CLS 104. Where a media content asset is to be later replicated or moved, CPM 103 is responsible for updating CLS 104 dynamically on the new media content asset location and/or status. Thus, in general CPM 103 is responsible for deciding where media content assets are to be stored, and CLS 104 is responsive to keeping track of those locations.

In the present example, multiple head ends 190 may be distributed geographically to serve the various client devices 201, and may each contain the functional blocks as shown in FIG. 1, which may operate as follows. Also, as shown by way of example in FIG. 2, each head end 190 may be coupled to, and serve, only a subset of the total set of client devices 201. Likewise, each streaming server 117 within a respective headend may be coupled to, and serve, only that respective subset of client devices 201. Thus, content to be delivered to a given client device 201 is forwarded to and provided by one of the streaming servers 117 that is coupled to the target client device 201.

Returning to FIG. 1, VOD backoffice 115 for each of head ends 190 may manage the receipt and fulfillment of VOD requests from those client devices 201 that are served by the respective head end 190, including session setup and stream control management of VOD media content assets. In addition, VOD backoffice 115 may receive asset title and content metadata from CMS 112 through AMS 114, and pass business rules such as trick mode restriction to streaming server 117 upon session setup time, assist with allocating edge QAM 118 resources for VOD sessions, and assist with advertisement insertion into the stream.

For instance, in response to a VOD request from one of client devices 201 served by a particular VOD backoffice 115, that VOD backoffice 115 may obtain the requested VOD media content asset from content delivery network 100 (if not already stored in head end 190) and cause the asset to be streamed in well-known ways to the requesting client device 201 via streaming server 117 and edge QAM 118, and/or CMTS 120 (which provides IP-based content streaming to client devices 201). Streaming server 117 may also include one or more computer-readable media for caching one or more of the media content assets, especially those that have been recently streamed by that streaming server 117.

Staging server 119 is used for Internet Protocol (IP) based streaming services for client data devices such as personal computers and smart phones. Staging server 119 supports various content formats and protocols, such as hypertext transfer protocol (HTTP) progressive download, FLASH download, and WINDOWS media streaming. Staging server 119 may also use the standard HTTP-based content locate and streaming protocol for pulling content from content delivery network 100. In addition, staging server 119 utilizes caching algorithms for caching library content from content delivery network 100.

Edge resource managers 116 manage bandwidth and program resources on QAMs 118. Edge resource managers 116 may support session requests from multiple session managers. If an edge device such as edge QAM 118 or CMTS 120 announces a failure to one of the edge resource managers 116, that edge resource manager 116 may be configured to not make any session related decisions. That edge resource manager 116 may instead forward a notification to the VOD system to determine how to resolve the issue.

As stated above, the media content assets may be permanently or temporarily stored in content delivery network 100 and/or at one or more head ends 190 at various distributed locations, including content library 101, one or more caching gateways 102, and/or one or more streaming servers 117. The actual locations at which each media content asset is stored may depend upon one or more factors, such as how popular the media content asset is to the end users, how popular the media content asset is expected to be, how often the media content assets is requested by one or more of the end users, and/or which end users have requested or are expected to request the media content assets. The locations at which the media content assets are stored may change dynamically over time in responses to changes in these and/or other factors.

Figure 2:
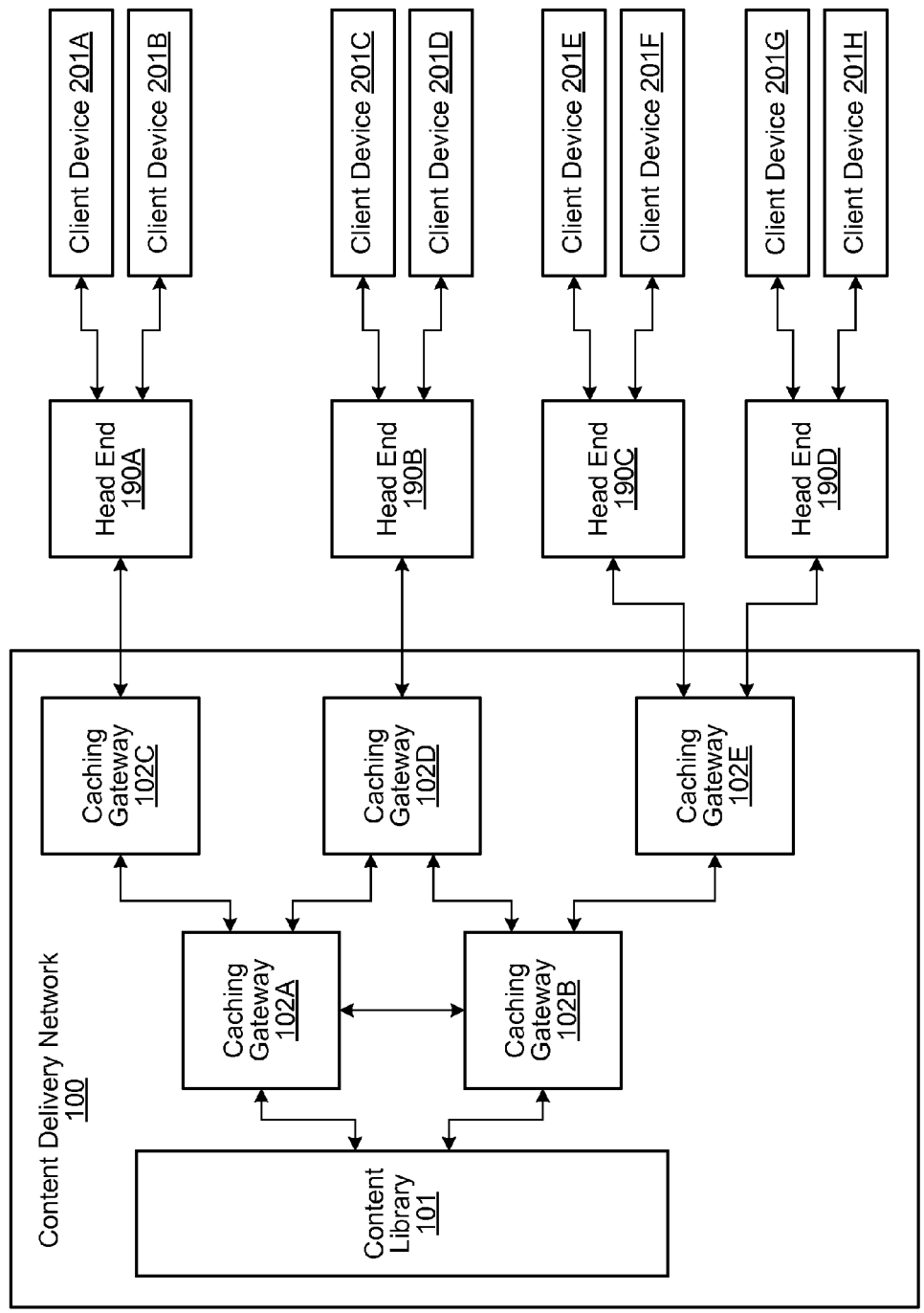
FIG. 2 is another illustrative functional block diagram of a portion of content delivery network 100 in conjunction with head ends and client devices.

FIG. 2 shows another illustrative functional block diagram of a portion of content delivery network 100 in conjunction with head ends 190A-D and client devices 201A-H. In this view, caching gateways 102 are shown as multiple caching gateways 102A-E. The number of caching gateways shown here is merely an example; there may be a fewer or greater number of caching gateways. Also in this example, caching gateways 102A-E are shown as being inter-coupled in a multi-tiered hierarchical topology. In particular, a first tier of caching gateways 102A, 102B and a second tier of caching gateways 102C-E, are provided. Also, a third tier in the hierarchy may be considered to be head ends 190A-D. Such a hierarchical topology may make certain organizations of media content assets easier. For example, a tier that is more local to a head end 190 may store copies of those content media assets that are the most requested or most popular (e.g., top ten) for client devices 201 of that head end 190, and a tier that is less local to that head end 190 may store copies of those content media assets that are less requested or less popular (e.g., top twenty) for client devices 201 of that head end. Using such a hierarchical caching technique, those storage nodes that are closer and more local to head ends may not need to be as large as those storage nodes that are more global and less local to head ends. Moreover, each tier may have its own network bandwidth resource management capability. For instance, each tier may be able to independently manage bit rates, compression, statistical multiplexing, and user limits. However, any topology of caching gateways and head ends may be used. As mentioned previously, content library 101 may also have a multi-tiered hierarchical topology.

Example operation scenarios of content delivery network 100 will now be described with reference to FIGS. 3-8.

Figure 3:
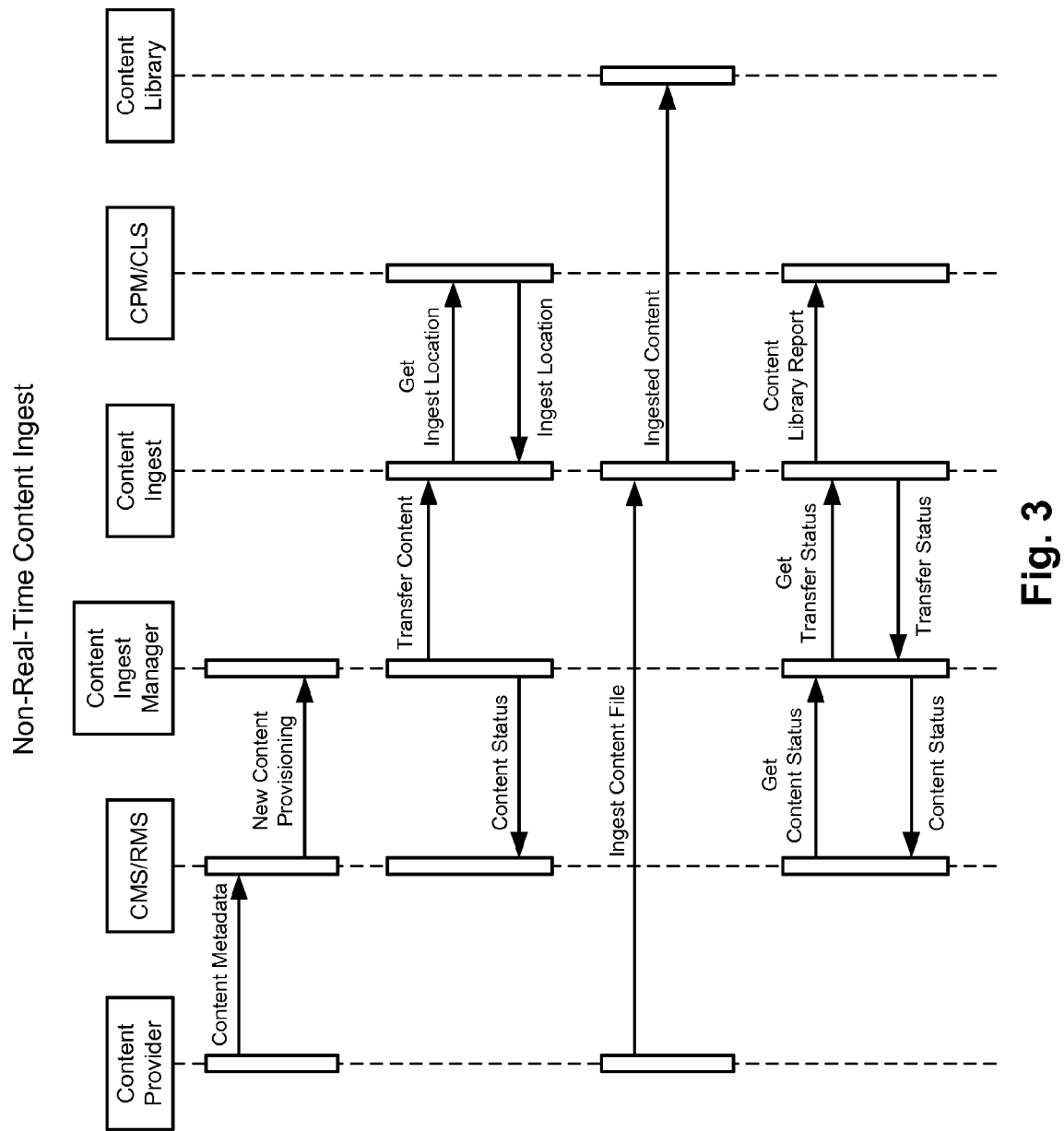
FIG. 3 is a diagram of illustrative interactions between various elements of a content delivery network and its environment, when performing ingest of non-real-time media content assets.

FIG. 3 is a diagram of illustrative interactions between various elements of content delivery network 100 and its environment, when performing ingest of non-real-time media content assets. In this example, metadata associated with a certain media content asset is delivered from a content source to RMS 111 and/or CMS 112. RMS 111 and/or CMS 112 generate a unique identifier for the media content asset, and provision the media content asset with content ingest manager 107. Content ingest manager 107 then instructs content ingest block 105 to begin content ingest. Content ingest block 105 queries CPM 103, and in response CPM 103 determines and returns to content ingest block 105 the target location(s) at which the media content asset will be stored in content library 101. Also, content ingest manager 107 periodically provides the content transfer status to RMS 111 and/or CMS 112.

Next content ingest block 105 retrieves the media content asset file from the content provider, and also interfaces with transcoder 108 and derived content generator 109 as needed, for transcoding the media content asset file and generating auxiliary trick files. The retrieved files and any generated trick files are saved to content library 101 at the previously determined location(s). Content ingest block 105 reports to CLS 104 upon completion of ingesting the content, and also to content ingest manager 107 about content transfer status. Then, content ingest manager 107 reports, or responds to a request from, RMS 111 and/or CMS 112 regarding content status.

Figure 4:
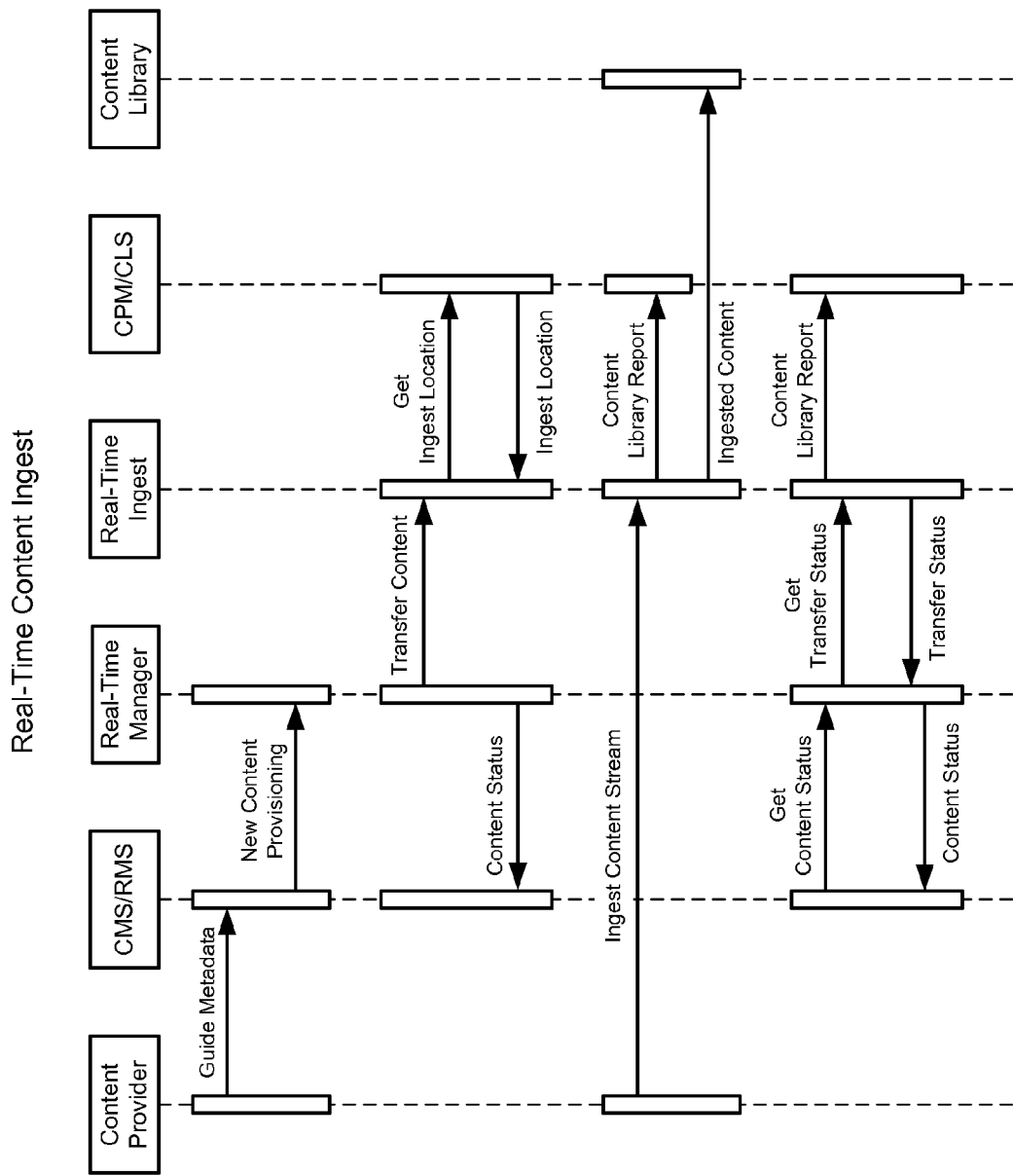
FIG. 4 is a diagram of illustrative interactions between various elements of a content delivery network and its environment, when performing ingest of real-time media content assets.

FIG. 4 is a diagram of illustrative interactions between various elements of content delivery network 100 and its environment, when performing ingest of real-time media content assets. The process is similar, with the main difference being that real-time manager 110 is used in place of content ingest manager 107, and real-time ingest block 106 is used in place of content ingest block 105. First, program guide metadata including a real-time program schedule is delivered from a content source to RMS 111 and/or CMS 112. RMS 111 and/or CMS 112 generate a unique identifier for the real-time media content asset, and provision the media content asset with content ingest manager 107. Real-time manager 110 then instructs content real-time ingest block 106 to begin stream ingest at times defined by the real-time program schedule. Real-time ingest block 106 queries CPM 103, and in response CPM 103 determines and returns to content ingest block 105 the target location(s) at which the real-time media content asset will be stored in content library 101. Also, content ingest manager 107 periodically provides the content transfer status to RMS 111 and/or CMS 112.

Upon the scheduled start of the real-time program, real-time ingest block 106 retrieves the media content asset stream from the content provider such as via IP multicast, and also interfaces with transcoder 108 and derived content generator 109 as needed, for transcoding the media content asset file and generating auxiliary trick files. The retrieved files and any generated trick files are saved to content library 101 at the previously determined location(s). Real-time ingest block 106 reports to CLS 104 upon completion of ingesting the stream, and also to real-time manager 110 about content transfer status. Then, real-time manager 110 reports, or responds to a request from, RMS 111 and/or CMS 112 regarding content status.

Figure 5:
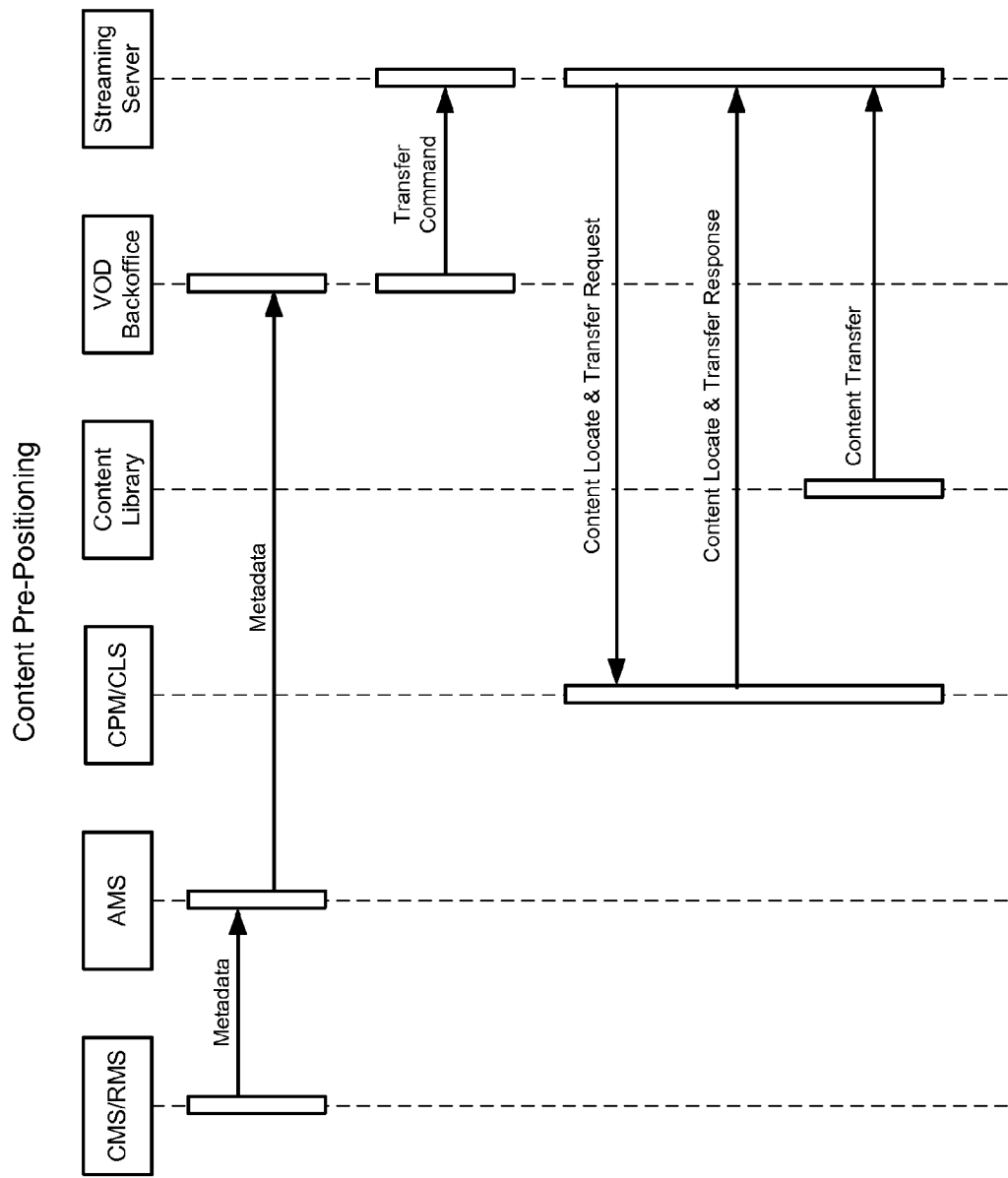
FIG. 5 is a diagram of illustrative interactions between various elements of a content delivery network and its environment, when pre-positioning a media content asset already stored in a content library to a replicated location.

FIG. 5 is a diagram of illustrative interactions between various elements of content delivery network 100 and its environment, when pre-positioning an entire media content asset, or a portion thereof, already stored in content library 101 to a replicated location. This pre-positioning may be performed regardless of any client device 201 request for the media content asset, and may be performed so as to replicate the media content asset to a location that is closer—geographically or logically—to client devices 201 that are expected to request the media content asset. In this particular example, a media content asset (or a portion thereof) is pre-positioned from content library 110 to a streaming server 117. However, this process could alternatively be used to pre-position the media content asset from and to any other locations, such as caching gateway 102 or elsewhere. Also in this particular example, the media content asset is a VOD asset, however any type of media content asset may be used.

New content is provisioned and ingested into content distribution network 100 by RMS 111 and/or CMS 112, which publish media content asset metadata to AMS 114. AMS 114, in turn publishes the metadata to some or all of the VOD backoffices 115. The VOD backoffice 115 associated with the target streaming server 117 determines that pre-positioning at the streaming server 117 is desired, and initiates a content transfer command to streaming server 117. In response streaming server 117 sends a content locate and transfer request to CLS 104. In response, CLS 103 redirects streaming server 117 to the actual location of the desired media content asset in content library 101. In response, the located media content asset (or a portion thereof) from content library 101 is replicated to streaming server 117.

In the example of FIG. 5, pre-positioning of a media content asset by replication occurred in response to a request from VOD backoffice 115. However, CPM 103 may alternatively initiate pre-positioning. Also, although in FIG. 5 the media content asset was pre-positioned to streaming server 117, such pre-positioning may be made to any computer-readable medium in content delivery network 100 and/or outside of content delivery network 100, such as in head end 190. For example, a media content asset (or a portion thereof) may be pre-positioned to one or more caching gateways 102.

Moreover, the particular location(s) to which a media content asset is pre-positioned, as well as whether or not such pre-positioning should occur in the first place, may be determined responsive to a determination that the media content asset is popular or is expected to be popular. This determination may be made by, e.g., CPM 103 and/or VOD backoffice 115. And, the particular location(s) to which the media content asset is pre-positioned may be determined based on which geographical locations served by content data network 100 and/or head ends 190 the popularity is expected to occur. For example, a newly-released movie may be expected to be popular throughout the country, and so the movie (or a portion thereof) may be pre-positioned to all or most caching gateways 102 and/or VOD backoffices 115. Or, a media content asset, or portion thereof, of particular interest to only a certain geographic region may be pre-positioned only to one or more caching gateways 102 and/or VOD backoffices 115 that serve that geographic region.

In addition, although a media content asset may be pre-positioned prior to any or substantial requests for that media content asset by client devices 201, the media content asset (or portion thereof) may further be replicated to one or more additional locations based on actual experienced requests by client devices 201 for that media content asset. And, once a media content asset has been pre-positioned or otherwise replicated to a location, the replicated copy of the media content asset may remain at that location for a predetermined period of time or until it is later determined that the popularity for that media content asset has dropped below a predetermined threshold, after which time the replicated copy may be deleted or moved to yet another location in the network.

Popularity of a media content asset may be determined in many ways, such as being based on a measured frequency of client device 201 requests for the media content asset, determining whether the media content asset has been requested by client devices 201 a sufficient number of times over a predetermined period of time, and/or based on historical or predicted future demand for the media content asset. Also, such determinations may be made on a global basis (i.e., across the entire network) and/or on a geographic regional basis, and may be made more than once over time to re-determine the popularity of the media content asset and re-replicate the entire media content asset or a portion thereof as appropriate based on the newly-determined popularity.

Trick files may be treated like any other type of media content asset, and thus may be pre-positioned and otherwise replicated in the same manner as any other type of media content asset. In some cases, it may be desirable to locate trick files in the same computer-readable media and/or otherwise a same node of the network as their associated program content files. In other cases, it may be desirable to locate trick files independently of the location of their associated program content if it is not expected that the trick file will be as popular as the program content itself.

Figure 6:
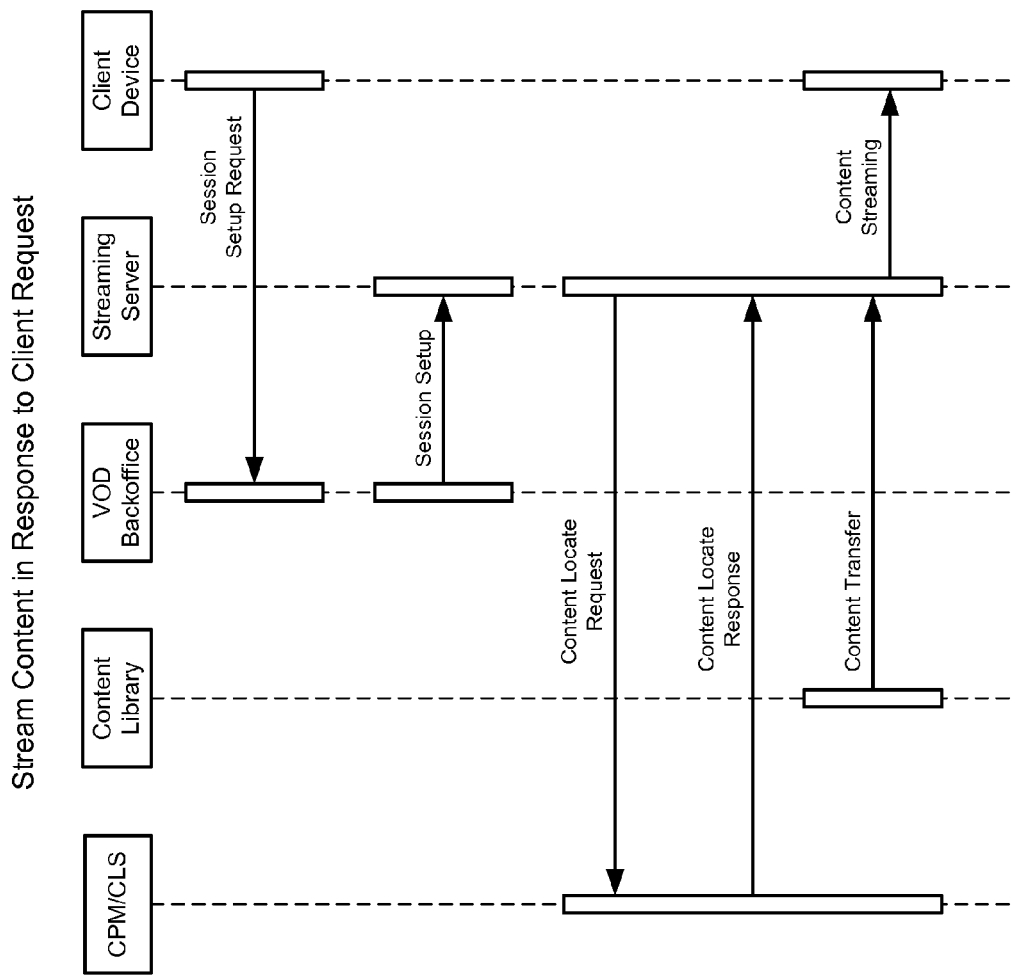
FIG. 6 is a diagram of illustrative interactions between various elements of a content delivery network and its environment, when streaming content to a client device in response to a request from the client device.

FIG. 6 is a diagram of illustrative interactions between various elements of content delivery network 100 and its environment, when streaming content to a client device 201 in response to a request from the client device 201. In this particular example, the media content asset is a VOD asset; however any type of media content asset may be used. Also in this particular example, the desired media content asset is streamed from a location in content library 101, however the media content asset may be stored anywhere such as in caching gateway 102 or in streaming server 117.

As before, new content is provisioned and ingested into content distribution network 100 by RMS 111 and/or CMS 112, which publish media content asset metadata to AMS 114. AMS 114, in turn publishes the metadata to some or all of the VOD backoffices 115. One of the VOD backoffices 115 optimistically processes a session setup request from client device 201, and in response to the request sends a session setup request to streaming server 117. In response, streaming server 117 checks its local cache for the requested content. If the content is available at the local cache of streaming server 117, then streaming server 117 will stream the content directly to the requesting client device 201. If the requested content is not stored at the local cache of streaming server 117, then streaming server 117 sends a content locate and transfer request to CLS 104.

In response, CLS 104 redirects streaming server 117 to the actual location in content library 101 (or elsewhere) where the requested media content asset is stored. In response to this redirection, streaming server 117 performs content transfer of the media content asset from content library 101, and streams the transferred content to the requesting client device 201.

Figure 7:
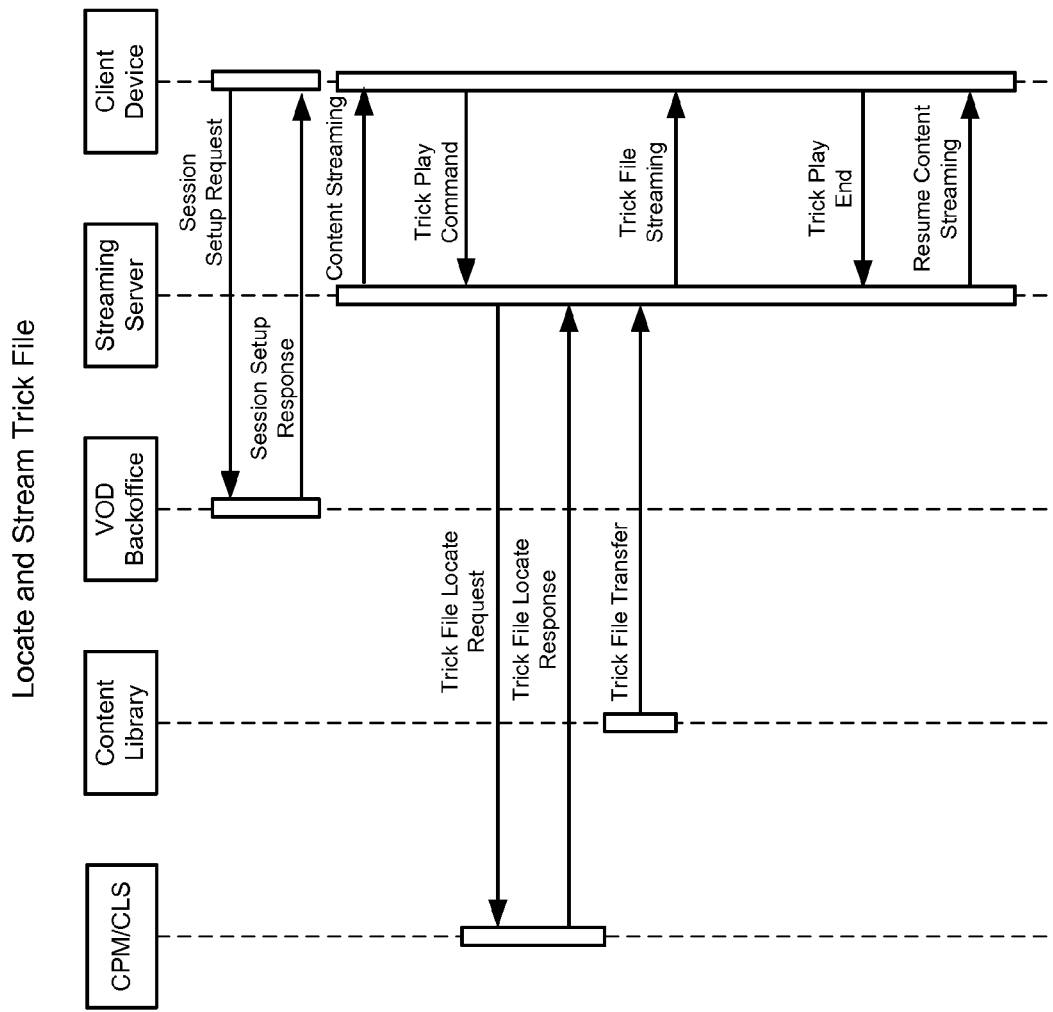
FIG. 7 is a diagram of illustrative interactions between various elements of a content delivery network and its environment, when a pre-stored trick file is requested to be streamed to a client device.

FIG. 7 is a diagram of illustrative interactions between various elements of content delivery network 100 and its environment, when a trick file or other type of derived content is requested to be streamed to a client device 201. In this particular example, the requested trick file is already generated and is stored in content library 101. However, the trick file may be stored elsewhere, such as in caching gateway 102 or streaming server 117.

After an initial setup request and response between client device 201 and VOD backoffice 201, content from content library 101 is streamed by streaming server 117 to client device 201. During the content streaming, the user of client device 201 requests a trick play function, such as by selecting "fast forward" on the remote control. In response to the user request, client device 201 sends a trick play command from client device 201 to streaming server 117. In response, streaming server 117 checks its local cache for the requested trick file. If the trick file is available at the local cache of streaming server 117, then streaming server 117 will stream the trick file directly to the requesting client device 201. If the requested trick file is not stored at the local cache of streaming server 117, then streaming server 117 sends a content locate and transfer request to CLS 104.

In response, CLS 104 redirects streaming server 117 to the actual location in content library 101 (or elsewhere) where the requested trick file is stored. In response to this redirection, streaming server 117 performs transfer of the trick file from content library 101, and streams the transferred trick file to the requesting client device 201.

Later, during streaming of the trick file, client device 201 may request that the trick play end (in response to a user request to end the trick play function) and that the content stream resume to the normal content that was streaming prior to the trick play. This request is received by streaming server 117, and in response streaming server 117 resumes normal content streaming to client device 201.

Figure 8:
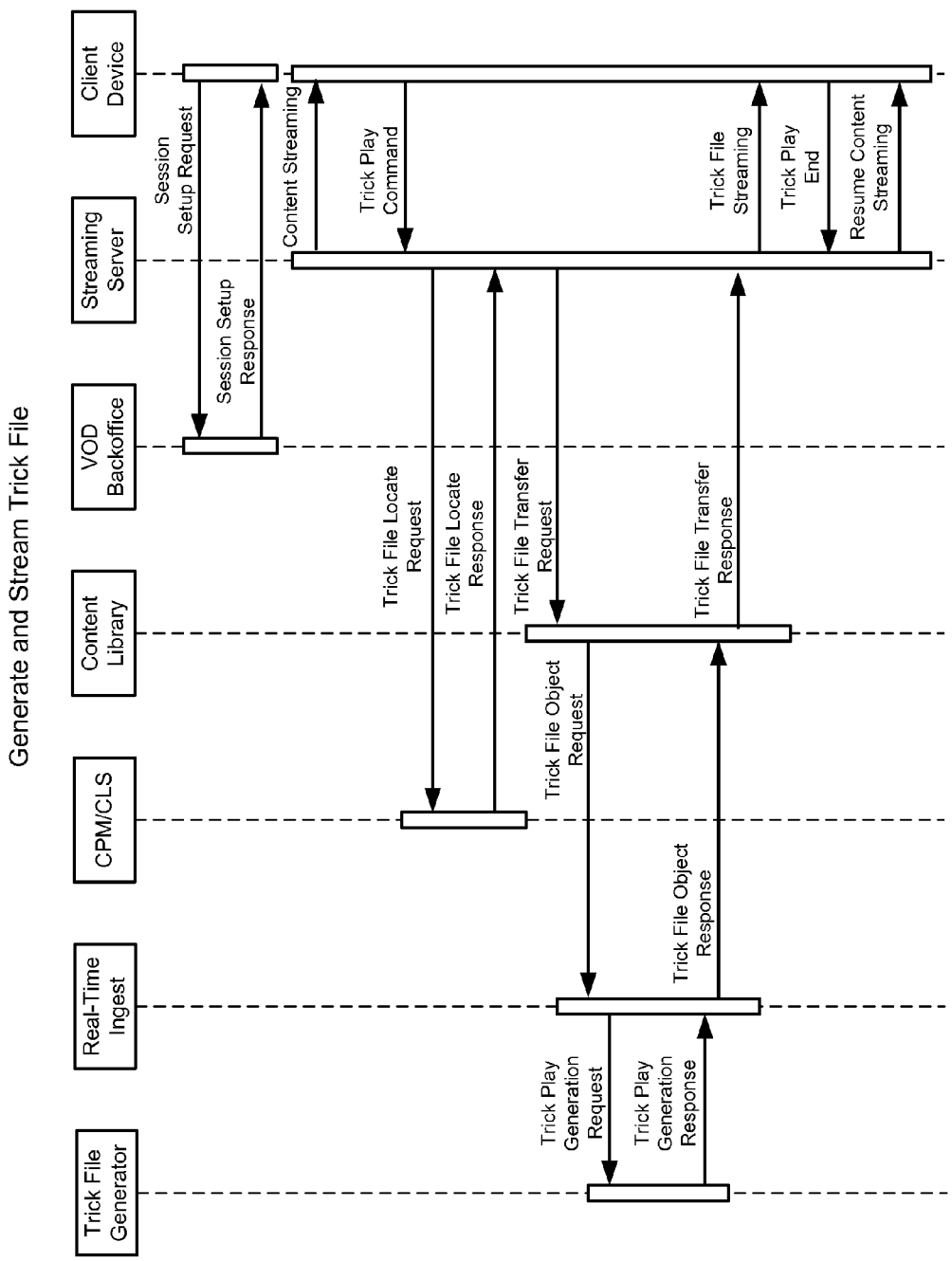
FIG. 8 is another diagram of illustrative interactions between various elements of a content delivery network and its environment, when a trick file that has not yet been created is requested to be streamed to a client device.

FIG. 8 is another diagram of illustrative interactions between various elements of content delivery network 100 and its environment, when a trick file or other type of derived content is requested to be streamed to a client device 201. This time, the requested trick file is not already generated and stored, and is to be generated in response to the client device 201 request, such as by deriving the trick file from an existing pre-stored or live media content asset. Although a trick file is requested and generated in this example, such dynamic generation may be performed to generate any type of media content file, such as a VOD movie or television program.

Trick files and other types of derived media content assets may be derived from original, or parent, media content assets in several ways. In one way, the derived content may be one or more portions of the original content, such as where the derived content is a trick file or movie trailer. For instance, the derived trick file may be a video file having every nth (n>1) video frame of the original content, such as in a fast-forward trick file.

Another way to derive content is to generate a re-formatted version of the original content. For example, the derived content may be based on the original content except at a lower video and/or audio resolution, different video frame size, being transcoded using a different CODEC, or configured to be played at a different bit rate or frame rate. This type of derivation may be desirable where, for example, the client device 201 that will be receiving the derived content is not compatible with the format of the original content.

Still another way to derive content from original content is to add content to the original content, such as by splicing in local or non-local advertising. This may be useful where, for example, it is desired to insert local advertising relevant to the geographical region in which client device 201 that will be receiving the derived content is located.

Any or all of these types of derivation may be used separately or together in any combination to provide a derived media content asset from an original live or stored media content asset.

In the example of FIG. 8, after an initial setup request and response between client device 201 and VOD backoffice 201, content from content library 101 is streamed by streaming server 117 to client device 201. During the content streaming, the user of client device 201 requests a trick play function, such as by selecting "fast forward" on the remote control. In response to the user request, client device 201 sends a trick play command from client device 201 to streaming server 117. In response, streaming server 117 checks its local cache for the requested trick file. If the trick file is available at the local cache of streaming server 117, then streaming server 117 will stream the trick file directly to the requesting client device 201. If the requested trick file is not stored at the local cache of streaming server 117, then streaming server 117 sends a content locate and transfer request to CLS 104.

In response, CLS 104 determines that the trick file is not stored in content library 101 (or elsewhere), and sends a trick file locate response to streaming server 117 indicating this. In response to the trick file locate response, streaming server 117 sends a trick file transfer request to content library 101, which in turn sends a trick file object request to real-time ingest 106. In response, real-time ingest 106 sends a trick play generation request to derived content generator 109, identifying the particular trick file that is needed, and streams the transferred trick file to the requesting client device 201. In response to the trick play generation request, derived content generator 109 generates the trick file, by deriving it from original live or store content such as described previously, and sends it (or an identifier that identifies the newly-generated trick file) back to real-time ingest 106 in the form of a trick play generation response. In this example of FIG. 8, the derived content is a trick file. However, the derived content may be any type of derived content, such as a movie trailer, reformatted content, or content spliced with local advertising.

In response to the trick play generation response, real-time ingest 106 sends a trick file object response indicating or including the trick file to content library 101, and then in response to that content library sends a trick file transfer response to streaming server 117. Content library 101 may also store the newly-generated trick file in the event that it is requested again. Next, streaming server 117 begins streaming the trick file to client device 201.

Later, during streaming of the trick file, client device 201 may request that the trick play end (in response to a user request to end the trick play function) and that the content stream resume to the normal content that was streaming prior to the trick play. This request is received by streaming server 117, and in response streaming server 117 resumes normal content streaming to client device 201.

In other embodiments, a command may be generated by client device 201, with or without user intervention, that requests derived content (trick file or otherwise). In such a situation, FIGS. 7 and 8 might be modified, for example, by the "trick play command" being replaced with the more generic "derived content request," which may be sent automatically responsive to establishing a session. In the derived content request, client device 201 may request that a particular type of formatted content be provided, such as a particular coding format, video frame size, bit rate, video and/or audio resolution, etc. The type of format requested may depend upon the type of device that client device 201 is. For example, where client device 201 is a smart phone with a cellular connection (directly or indirectly) to streaming server 117, client device 201 may request a low-resolution and/or low bit-rate version of the content.

As previously discussed, one of the locations at which a media content asset may be stored is at a streaming server 117 of a head end 190. While this may occur through normal replication of the asset from content library 101, it is also possible that the media content asset may be stored only locally at streaming server 117 and not centrally or globally at content library 101. In such a case, the ingested media content asset may either be transferred from content library 101 to streaming server 117 without maintaining a copy at content library 101, or the media content asset may be ingested and stored directly in streaming server 117 without first being stored in content library 101. Any of these situations may be determined and controlled by, for example, content propagation manager 103. In the latter situation, a media content asset may be stored at one or more streaming servers 117 but not necessarily at content library 101 when the media content asset is considered a local media content asset. That is, a media content asset that is expected to have interested viewers only in one or more local geographic regions, or an asset that is licensed only to be viewed in one or more local geographic regions rather than nationwide.

For example, a local semi-professional baseball game may be recorded and provided to viewers in northern California. It would not be expected that many viewers anywhere other than northern California would be interested in viewing that game. Thus, it would not necessarily be efficient to store a media content asset showing that game in content library 101 or at head ends 190 or caching servers 102 not located in northern California. Therefore, it might be preferable in such a situation to normally store the asset only locally in one or more network locations in or near northern California.

Figure 9:
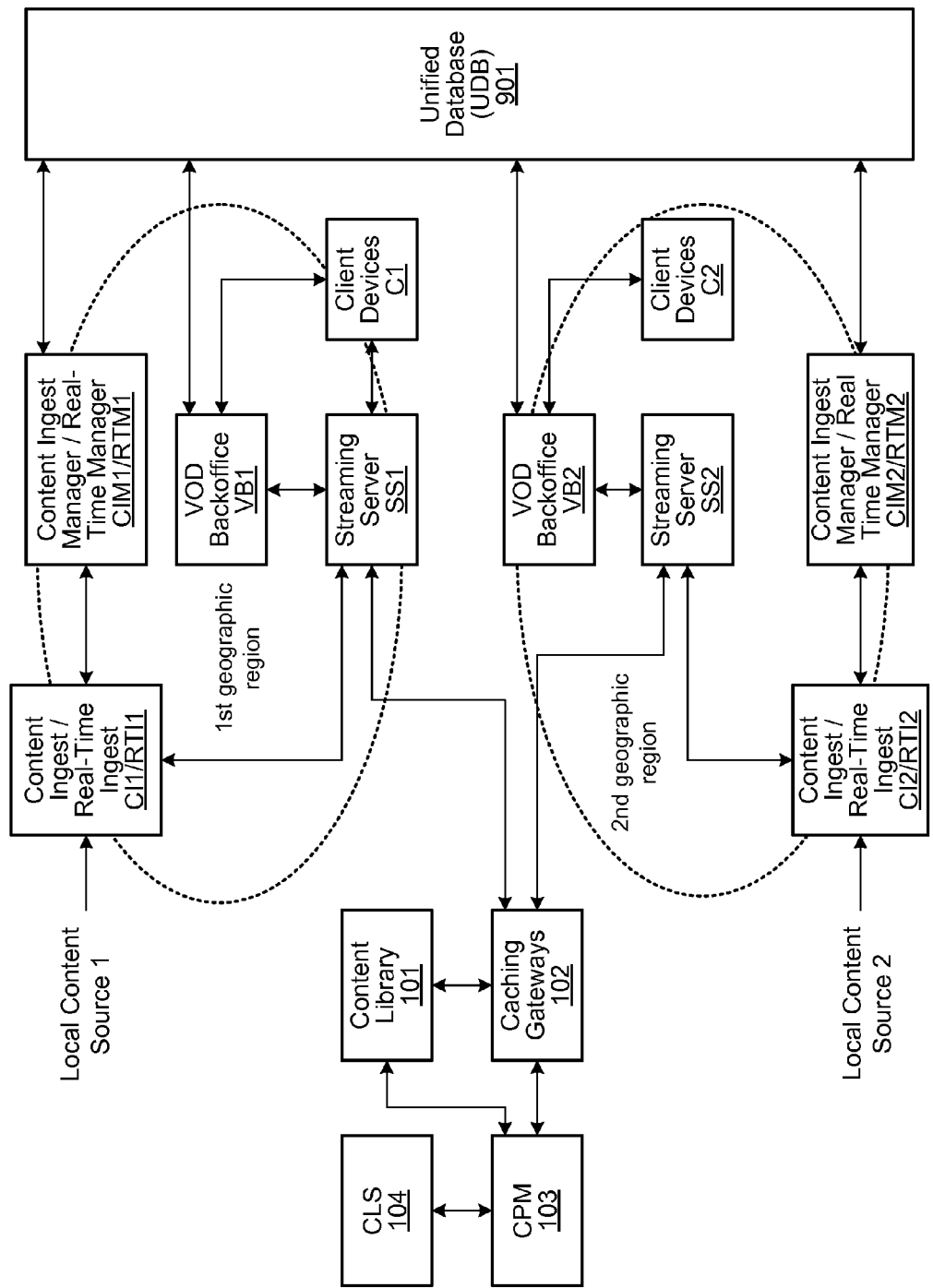
FIG. 9 is a functional block diagram of an example of how a content delivery network may be used to perform bi-directional local content sharing between head ends.

However, there may be an occasion where someone outside of northern California (in the above example) would like to view the game. To accomplish this, the network may be configured to allow bi-directional sharing between head ends 190 that serve different geographic regions, or in fact between any two head ends 190 in the network. FIG. 9 is a functional block diagram of an example of how content delivery network 100 may be used to perform such bi-directional local content sharing.

In the example of FIG. 9, there are multiple content ingest managers 107, real-time ingest managers 110, content ingest blocks 105, and real-time ingest blocks 106 that are part of content delivery network 100, each serving a different geographic region. For instance, FIG. 9 shows that a first geographic region is served by content ingest block CI1, real-time ingest block RTI1, content ingest manager CIM1, and real-time ingest manager RTM1. Likewise, a second geographic region is served by content ingest block CI2, real-time ingest block RTI2, content ingest manager CIM2, and real-time ingest manager RTM2. Also, a first head end 190 serving the first geographic region includes VOD backoffice VB1 and streaming server SS1, whereas a second head end 190 serving the second geographic region includes VOD backoffice VB2 and streaming server SS2. Each geographic region also serves their own sets of client devices 201, represented illustratively in FIG. 9 as client device C1 for the first geographic region and as client device C2 for the second geographic region.

The first and second geographic regions may be geographically separate from each other, such as being in different cities, counties, states, or countries. In terms of distance, the first and second geographic regions may be close to each other or far from each other, such as at least five hundred miles apart from each other.

A unified database (UDB) 901 for storing metadata describing media content assets is communicatively coupled (uni-directionally or bi-directionally) to equipment serving both the first and second geographic regions. For instance, as shown in FIG. 9, UDB 901 is coupled to content ingest manager CIM1, real-time ingest manager RTM1, content ingest manager CIM2, real-time ingest manager RTM2, VOD backoffice VB1, and VOD backoffice VB2. Any or all of these blocks are capable of querying and updating the data stored in UDB 901.

The media content assets for which metadata is stored in UDB 901 may include local media content assets received by a content source that serves or is located in the first or second geographic region, such as Local Content Source 1 and Local Content Source 2 in FIG. 9. These local media content assets are received into content ingest manager CIM1, real-time ingest manager RTM1, content ingest manager CIM2, or real-time ingest manager RTM2.

When a local media content asset is ingested at one of the geographic locations, the local media content asset (either real-time or non-real-time) may be stored at a head end 190, such as the head end 190 serving that geographic location. In particular, the media content asset may be stored at the streaming server or otherwise at a computer-readable medium to which the streaming server has access. In addition, the metadata for that local media content asset may be passed on to UDB 901. Because UDB 901 shares access to multiple geographic regions, such as the first and second geographic regions of FIG. 9, the metadata for a media content asset may be available to any of those geographic regions even though the media content asset itself may only be stored at one of those geographic regions.

For example, if a local media content asset is ingested by content ingest block CI1, the local media content asset may be stored at streaming server SS1, and the metadata for that local media content asset may be stored in UDB 901, such as via a path from content ingest block CI1 to content ingest manager CIM1 to UDB 901. In this example, the local media content asset is a VOD asset. If client device C1 wishes to view the local media content asset, then VOD backoffice VB1 can look up the metadata for that asset in UDB 901 and determine from CLS 104 that the asset is stored at streaming server SS1. The asset is then streamed to client device C1 from streaming server SS1. If client device C2 wishes to view the local media content asset, then VOD backoffice VB2 can also look up that same metadata for the asset in UDB 901 and determine from CLS 104 that the asset is stored at streaming server SS1. The asset can then be transferred to streaming server SS2, such as via a caching gateway 102. Streaming server SS2 then streams the asset to client device C2. Thus locally-stored content may be shared between different geographic regions of the network.

Figure 10:
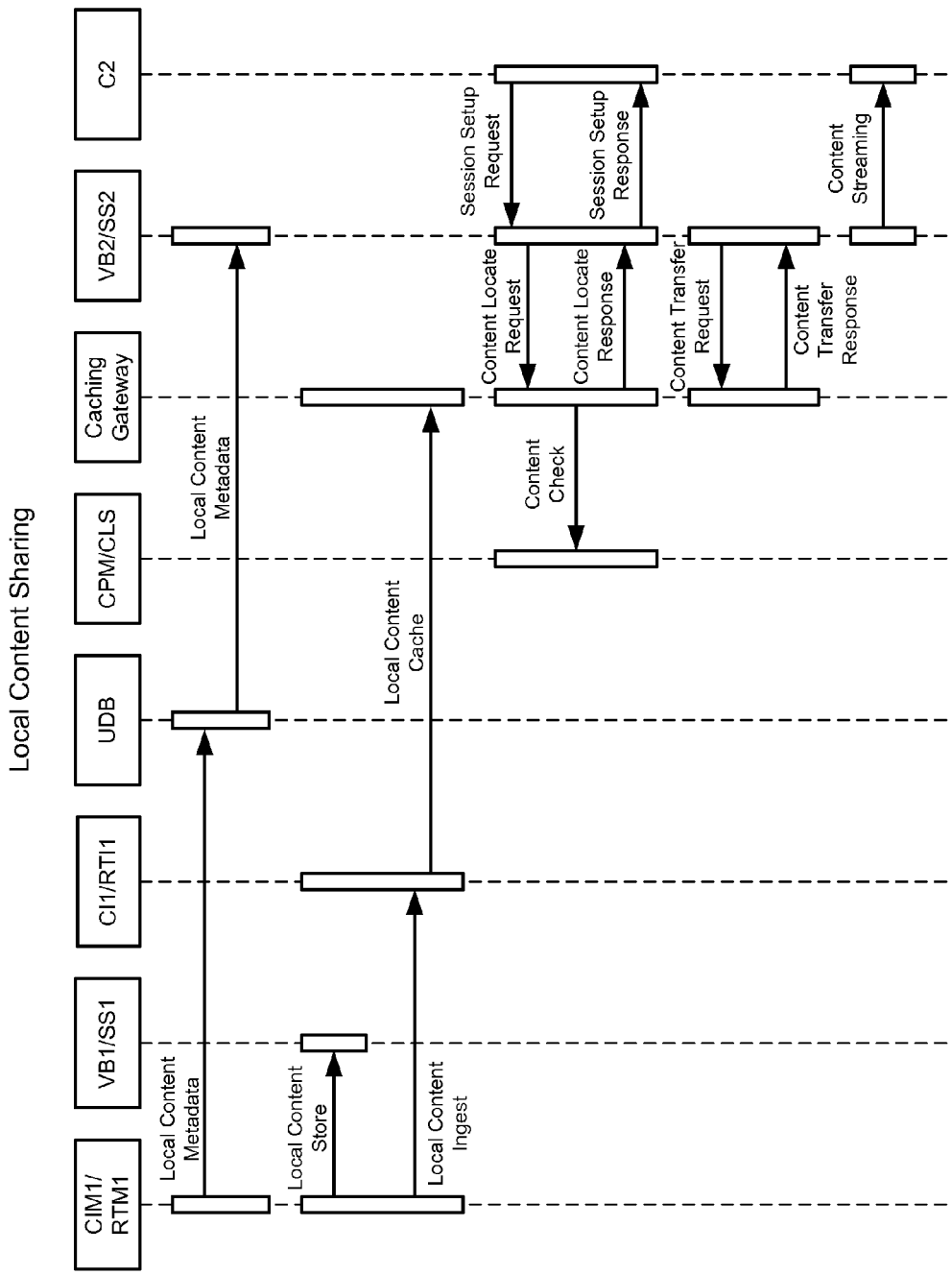
FIG. 10 shows illustrative interactions between various equipment when a local media content asset is shared between streaming servers of two different head ends.

An example of interactions between various equipment when a local media content asset is shared between streaming servers is shown in the diagram of FIG. 10. Metadata for a local media content asset is received by content ingest block CI1 (for a non-real-time asset) or real-time ingest block RTI1 (for a real-time asset). The metadata is then forwarded by content ingest manager CIM1 or real-time manager RTM1 to UDB 901 for storage. The actual local media content asset may be ingested by content ingest CI1 or real-time ingest RTI1, and stored at streaming server SS1 and/or a caching gateway 102 local to streaming server SS1.

At some future point in time, the metadata for that local media content asset is replicated, in whole or in part, from UDB 901 to VOD backoffice VB2, either spontaneously or in response to a request for the local media content asset by VOD backoffice VB2, and some or all of the metadata for that asset may be passed on to client device C2, such as in the form of an electronic program guide indicating the local media content asset as an available choice. In response to a session setup request from client device C2, such as by the user selecting the indicated local media content asset from the program guide, VOD backoffice VB2 sends a content locate request to its local caching gateway 102 (not necessarily the same caching gateway at which the local media content is stored). In response, caching gateway 102 performs a content check with CLS 104, which returns the location of the desired local media content asset to caching gateway 102 and then on to VOD backoffice VB2. VOD backoffice VB2 then sends a session setup response to client device C2 and requests that the found local media content asset be replicated to streaming server SS2. The transfer is performed, and streaming server SS2 streams the local content media asset to client device C2.

Alternatively, rather than streaming the replicated media content asset, it may be possible that client device C2 desires a different format of the media content asset. In that case, either during or after session setup, client device C2 may request that the media content asset be in a particular format. If the particular format is not already pre-stored, then similar to the FIG. 8 embodiments, derived content generator 109 may derive the requested version of the media content asset such that the derived version is streamed to client device C2.

The process of FIG. 10 may also be reversed, such as where the local media content asset is initially received, ingested, and stored at the second geographic region and transferred to the first geographic region. And, as in the other embodiments described herein, any of the media content assets shared between video-on-demand systems may be live media content assets or non-live media content assets.

Thus, various systems, apparatuses, methods, and software have been described by way of example for using a network to efficiently distributing media content assets from a virtually unlimited content library and/or other storage to a plurality of client devices. In addition, it has been shown how bi-directional local content sharing between head ends may be accomplished, as well as dynamic distribution and generation of media content assets within the network.

The invention claimed is:

1. A method, comprising:
   responsive to determining that a first media content asset is not stored in a network, wherein the determining comprises determining that a requested trick file is not stored in a cache of the network, retrieving a second media content asset through the network from a first location, wherein the retrieving comprises retrieving from a content library a stored media asset that corresponds to content currently being transmitted to a user device;
   using the second media content asset to generate a third media content asset, wherein the using the second media asset to generate the third media asset comprises generating a new trick file from the stored media asset;
   sending the third media content asset, through the network, to the first location, wherein the sending of the third media content asset comprises sending the new trick file to the content library, and storing the new trick file at the content library;
   sending a copy of the third media content asset through the network to a second location different from the first location, wherein the sending of the copy of the third media content asset comprises sending a copy of the new trick file to a transmitting device;
   delivering the third media content asset to a user device; and
   updating a database of the network to include data that identifies the transmitting device to which the new trick file was sent.

2. The method of claim 1, wherein the using comprises generating the third media content asset by transcoding at least a portion of the second media content asset from a first format to a second format.

3. The method of claim 1, wherein the using comprises generating the third media content asset by transcoding at least a portion of the second media content asset from a first bit rate to a second bit rate.

4. The method of claim 1, wherein the using comprises generating the third media content asset by transcoding at least a portion of the second media content asset from a first video resolution to a second video resolution.

5. The method of claim 1, wherein the second media content asset comprises a movie and the third media content asset comprises a movie trailer of the movie, the using comprising generating the movie trailer from the movie.

6. The method of claim 1, wherein the third media content asset comprises a combination of the second media content asset and additional advertising, wherein the advertising depends upon a geographical location of the client device.

7. The method of claim 1, wherein the third media content asset comprises substantially a same content as the first media content asset.

8. The method of claim 1, wherein the third media content asset is different from the first media content asset.

9. The method of claim 1, wherein the using comprises generating the third media content asset to include content that depends upon a geographical location of the client device.

10. The method of claim 1, further comprising:
    determining whether a popularity of the second media content asset exceeds a predetermined threshold; and
    responsive to determining that the popularity of the second media content asset exceeds the predetermined threshold, storing the copy of the third media content asset at the second location.

11. The method of claim 1, further comprising:
    determining whether the second media content asset is stored at the second location; and
    responsive to determining that the second media content asset is not stored at the second location, storing the copy of the third media content asset at the second location.

* * * * *